Figure 1:
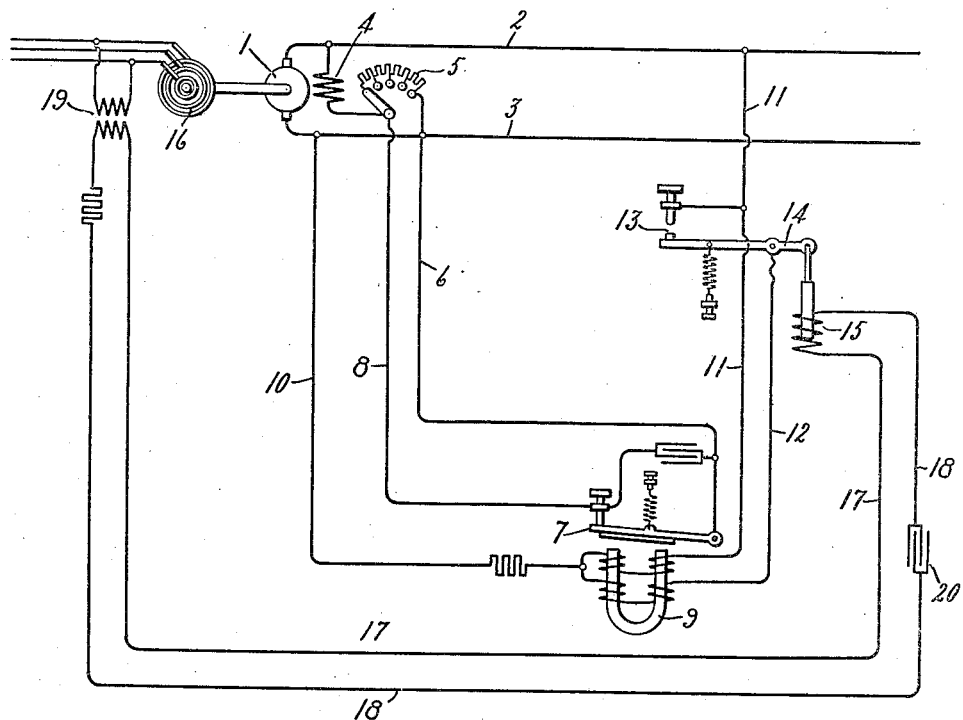

Witnesses:
J. Earl Ryan
Marcus L. Byng

Inventor
Allen A. Tirrill,
by Alfred S. Davis
Atty.

A. A. TIRRILL.
MOTOR SPEED REGULATOR.
APPLICATION FILED JAN. 9, 1909.

1,029,480.

Patented June 11, 1912.
2 SHEETS—SHEET 2.

Witnesses:
J. Earl Ryan
Marcus L. Byng

Inventor
Allen A. Tirrill,
by
Atty.

UNITED STATES PATENT OFFICE.

ALLEN A. TIRRILL, OF SCHENECTADY, NEW YORK, ASSIGNOR TO GENERAL ELECTRIC COMPANY, A CORPORATION OF NEW YORK.

MOTOR SPEED-REGULATOR.

1,029,480.  Specification of Letters Patent.  Patented June 11, 1912.

Application filed January 9, 1909. Serial No. 471,381.

*To all whom it may concern:*

Be it known that I, ALLEN A. TIRRILL, a citizen of the United States, residing at Schenectady, county of Schenectady, State of New York, have invented certain new and useful Improvements in Motor Speed-Regulators, of which the following is a specification.

It is desirable in some instances to maintain the speed of a motor constant under conditions of varying load or varying impressed voltage. As is well known, the counter-electromotive force generated in the armature coils of a motor varies with the speed at which the motor is running and with the strength of the field. The energy consumed by the motor is proportionate to the difference between the impressed electromotive force and the counter-electromotive force. Therefore, if either the load or the impressed voltage on the motor varies the speed varies until the counter-electromotive force has changed to the new value now required to leave the required margin between the impressed and counter-electromotive forces, which will be proportionate to the consumption of energy. The same result is accomplished by varying the field excitation of the motor, for example, increasing it with a decrease of load, thereby causing the counter-electromotive force to rise without an increase of speed, and weakening it with an increase of load, so that the counter-electromotive force may fall without a decrease of speed.

According to my invention the speed of the motor is maintained constant by inserting and removing resistance in its field circuit by means of an electrically operated switch, which is actuated by current derived from an alternating-current generator driven by the motor. The inductance and capacity in the circuit of the electrically operated switch are so proportioned that the circuit is resonant to a frequency higher than the normal frequency of the alternating current generated by the alternator when the motor is running at normal speed. Therefore, as the speed of the motor tends to vary and the frequency of the alternating current tends to increase, so as to approach, or tends to decrease, so as to recede from the frequency of resonance, the current in the switch-controlling circuit will vary accordingly, increasing as the frequency approaches nearer to the frequency at which the circuit is resonant, and decreasing as it recedes from the frequency for which the circuit is resonant. The voltage of the alternating current likewise varies with the change of speed of the motor driving the alternating-current generator, the voltage rising with the increase of speed and falling with a decrease of speed. The power of the magnet controlling the switch is thus affected by two varying factors, the frequency and the voltage of the alternating-current generator, both varying directly with the speed of the motor, and it is by this means made very sensitive to changes in speed. The alternating-current generator may be a small machine, which is either mounted on the same shaft as the motor, or connected to the same by belting, or in some other suitable way. If it is desired to make the regulation still more sensitive the speed of the alternating-current generator may be made greater than that of the motor driving the same, by suitable gearing. In some cases it is not necessary to provide a separate generator, as when the speed of a motor-generator set, consisting of a direct-current motor and alternating-current generator, is to be maintained constant, since in this case the switch, of course, can be operated by current derived from the alternating-current machine.

Figure 2:
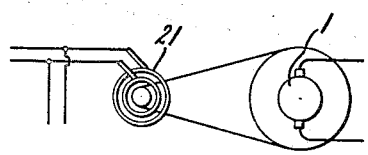
Figure 3:
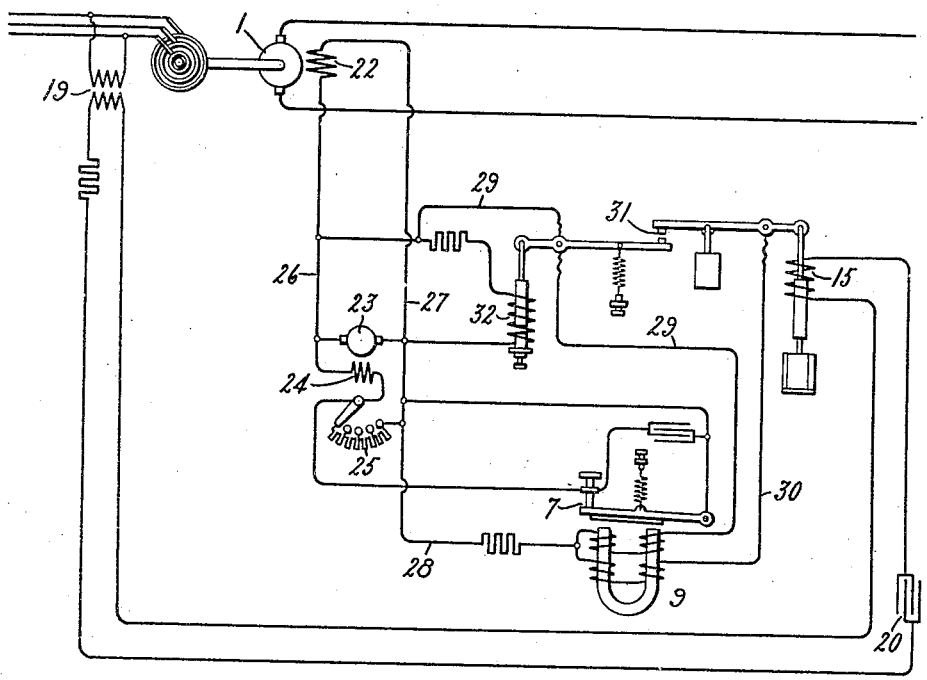
Figure 4:
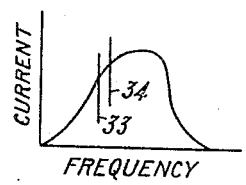

In the attached drawings, Figure 1 is a diagram of circuits, illustrating my invention in its simplest form; Fig. 2 is a fragmentary view, showing the alternating-current generator geared up to rotate at a higher speed than the motor; Fig. 3 shows a modified system in which the motor is provided with a separate exciter, the switch operating on the field of the exciting machine; and Fig. 4 is a curve expressing the relation of current and frequency in a resonant circuit.

Referring to Fig. 1, the direct-current motor 1, supplied with current from conductors 2, 3, has a shunt field 4 in series with which is an adjustable resistance 5. This resistance should have a greater value than that required to vary the speed of the motor for ordinary operation. Around the resistance is a shunt circuit consisting of conductor 6, vibrating contacts 7 and conductor 8. A switch lever opening and closing the contacts 7 is controlled by relay magnet 9, which has two opposing windings, one being permanently connected across the supply conductors 2, 3 by conductors 10, 11, and the other connected to supply conductors 2, 3, through conductors 10, 12, vibrating contacts 13 and conductor 11. The switch lever 14 controlling the contacts 13 is actuated by electromagnet 15. The magnet 15 is energized by current from an alternating-current generator 16 mounted on a common shaft with the motor 1. The generator, although here shown as a three-phase generator, may have any number of phases. The magnet in this case is shown as being supplied with current by means of conductors 17, 18 from a shunt transformer 19, the primary of which is connected across one of the phases of the alternating-current generator. In circuit with the magnet 15 is a condenser 20, which is so proportioned with reference to the inductance of the circuit that the circuit containing magnet 15, transformer 19, and the condenser will be resonant to a frequency higher than the normal frequency of the generator 16. The motor and the alternator are shown in Fig. 1 as of the same order of size and directly connected, as in a motor-generator set; but as already indicated above, the alternator may be very small in comparison to the motor and, if desired, may be geared to the same to run at a higher speed. This is illustrated in Fig. 2, in which a single-phase alternator 21 is belted to the motor, the rest of the system being understood to be similar to that shown in Fig. 1.

The system shown in Fig. 3 is suitable for operation with a larger motor, the field of which is separately excited. Referring to this figure, the field 22 is energized by exciter 23. The shunt field 24 of the exciter has a resistance 25 included in its circuit, which is controlled by a relay magnet operating similarly to relay magnet 9 in Fig. 1. One winding of the relay magnet is directly connected across the exciter mains 26, 27 by means of conductors 28, 29, and the opposing winding is likewise connected across these mains by means of conductors 28, 30, contacts 31, and conductor 29. The contacts 31 are in this case controlled by an alternating-current magnet 15, which is similar to that shown in connection with Fig. 1; but which operates in conjunction with a direct-current magnet 32 connected across the exciter mains, as clearly shown. In both Figs. 1 and 3 sparkling at the contacts 7 is suppressed by means of condensers.

The operation of the system illustrated in Fig. 1 is as follows: As the speed of the motor 1 tends to rise above normal, and the armature of the alternator 16 is, therefore, rotated at somewhat higher speed, the frequency of the alternating current tends to rise. The circuit of magnet 15 being resonant to a frequency higher than the normal frequency of the alternator 16, will tend to take more current because of the rise in frequency and voltage, as already explained. Contacts 13 will, therefore, close in turn causing the relay contacts 7 to close and shunting the resistance 5 in the field circuit of the motor. This will increase the field strength of the motor, and thus decrease its speed. The contacts 13, of course, will remain closed until the motor speed has returned to normal. As the resistance 5 is comparatively large, its corrective effect will be almost instantaneous on the speed of the motor, and, therefore, the contacts 13 will remain closed only a comparatively short time. The magnet 15 will ordinarily be operated at a frequency lower than that of resonance. In Fig. 4 the range of frequencies at which the magnet 15 is effective is indicated on the ascending branch of the curve between the ordinates 33, 34. If the speed of the motor tends to fall below normal, and, therefore, the frequency of the alternator tends to fall below normal, the current taken by the magnet 15 will fall below that corresponding to the portion of the curve defined by lines 33, 34, and the power of magnet 15 will not be sufficient to close contacts 13. Relay contact 7 will, therefore, open, inserting the resistance 5 and weakening the motor field so as to increase its speed.

The operation of the system shown in Fig. 3 is similar to that described in connection with Fig. 1. An increase in the speed of motor 1 above normal will in the same way, as already described in connection with Fig. 1, increase the power of magnet 15, closing the contacts 31, which in turn causes relay contacts 7 to close and short circuits resistance 25 in the field circuit of the exciter. The exciter voltage will, therefore, rise, strengthening the motor field and decreasing its speed. The increase of exciter voltage will cause the magnet 32 to draw down its core, maintaining the contacts 31 closed for a little longer interval of time, until the speed of motor 1 has fallen off sufficiently to decrease the frequency of the alternator, causing magnet 15 to open contacts 31 and lowering the voltage of the exciter. The effect of magnet 32 is, therefore, to lengthen the intervals during which contacts 31 are opened or closed, enabling the motor 1 to change its speed back to normal. It is obvious, of course, that the alternating-current generator in this figure, as well as in Fig. 1, may be a small generator belted to a motor to run at a higher speed if still greater sensitiveness of regulation is desired than is given by a directly connected alternator.

What I claim as new and desire to secure by Letters Patent of the United States, is,—

1. The combination of a source of power, an alternating current generator driven thereby, and means for varying the speed of said source of power, said means being responsive to changes of voltage and to changes of frequency of the current from said generator.

2. The combination of a motor, an alternating current generator driven thereby, a resistance in the field circuit of said motor and a make and break device for periodically short circuiting said resistance, the relative length of the intervals of make and break being responsive to variations of frequency of the generator current.

3. The combination of a motor having a shunt field winding, a resistance in the field circuit of the motor, an alternator driven by said motor, electromagnetic means operated by current derived from the alternator for shunting said resistance, said means being included in a circuit resonant to a frequency higher than the normal frequency of the current generated in the alternator.

In witness whereof, I have hereunto set my hand this 5th day of January 1909.

ALLEN A. TIRRILL.

Witnesses:
   BENJAMIN B. HULL,
   HELEN ORFORD.